Feb. 14, 1961

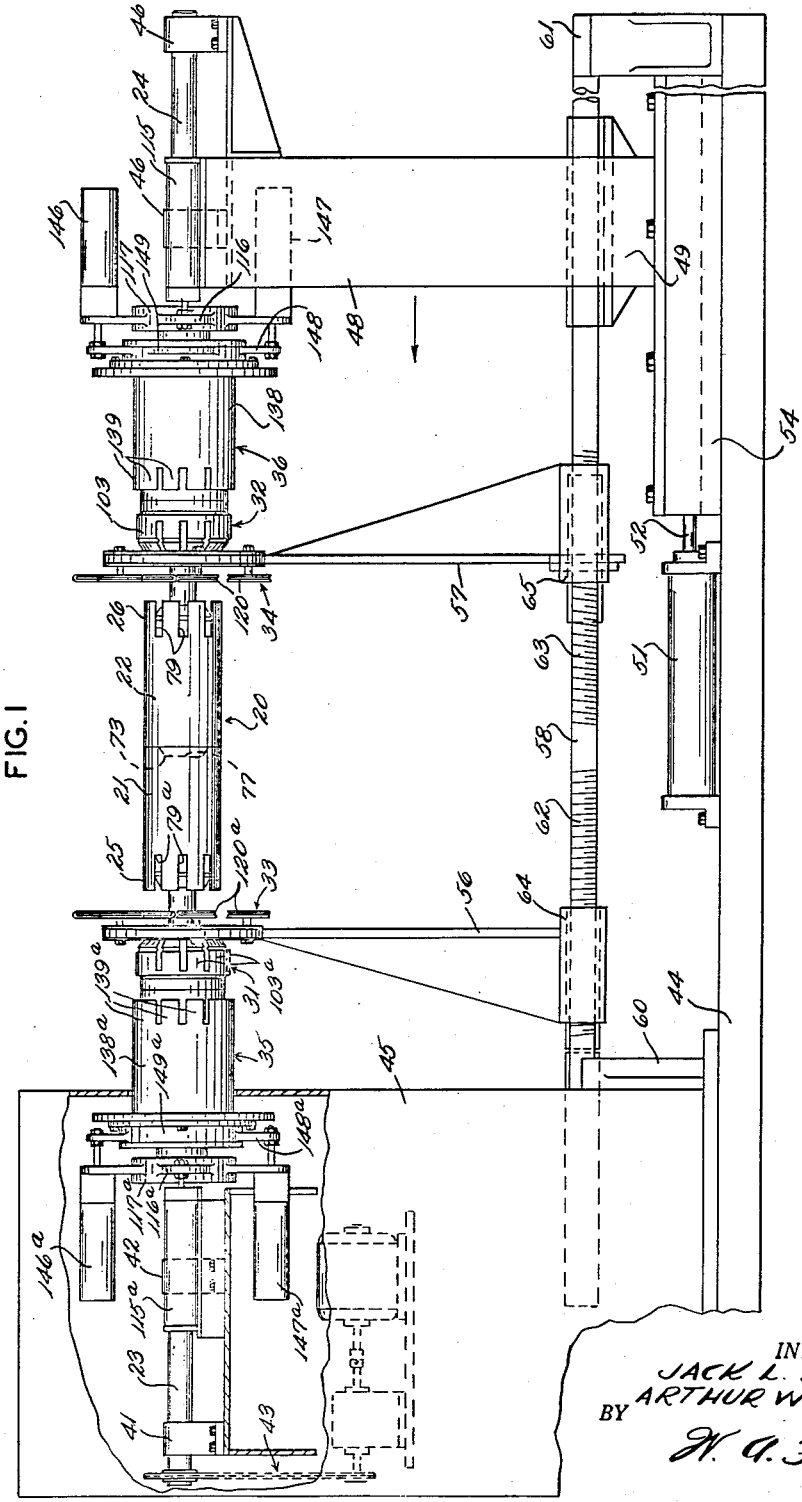

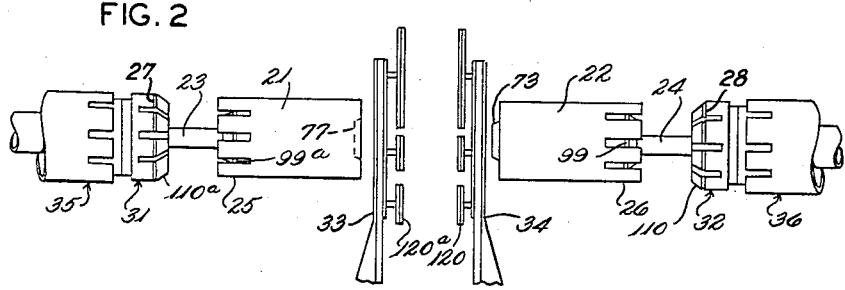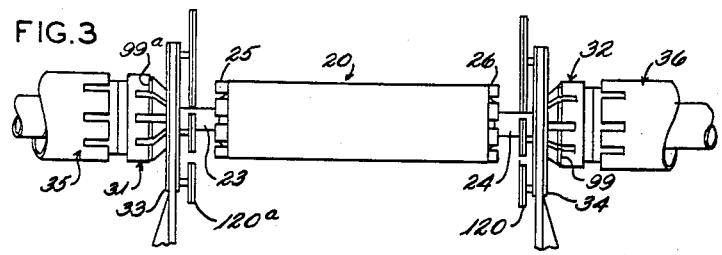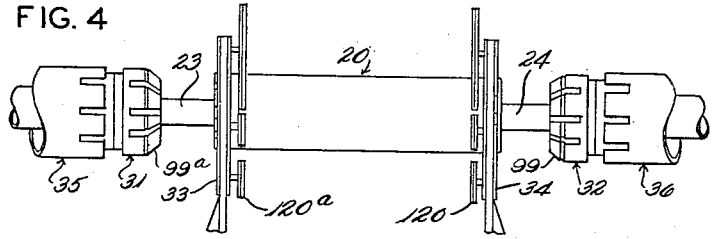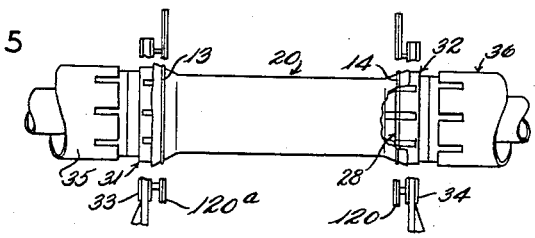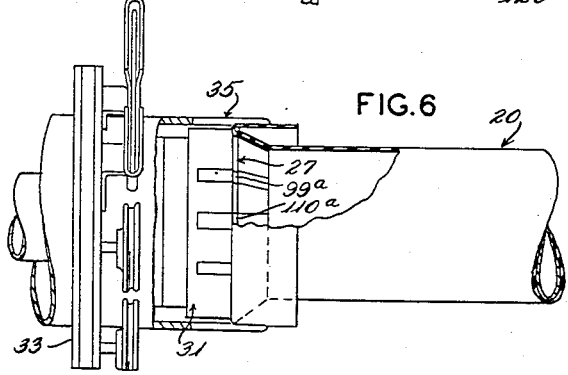

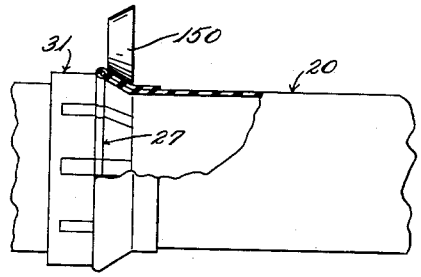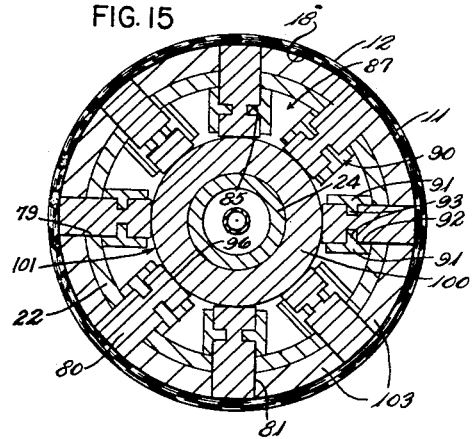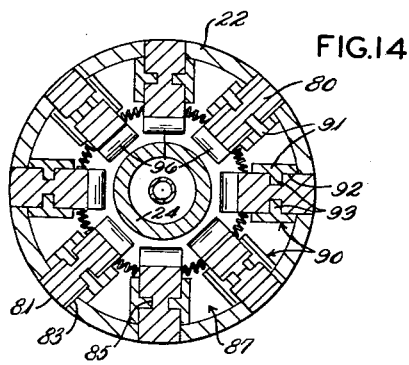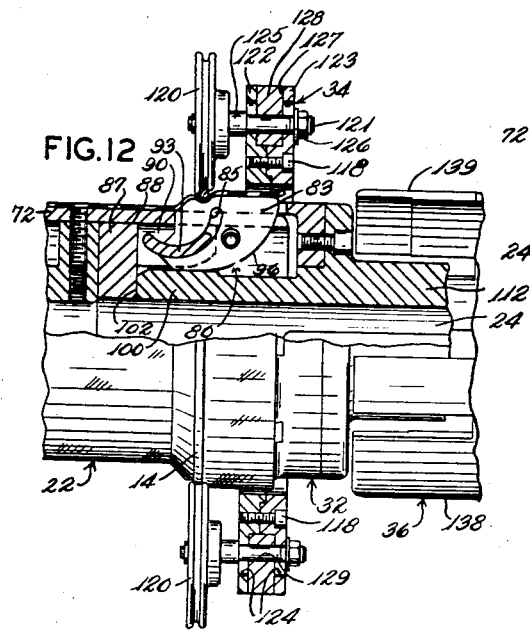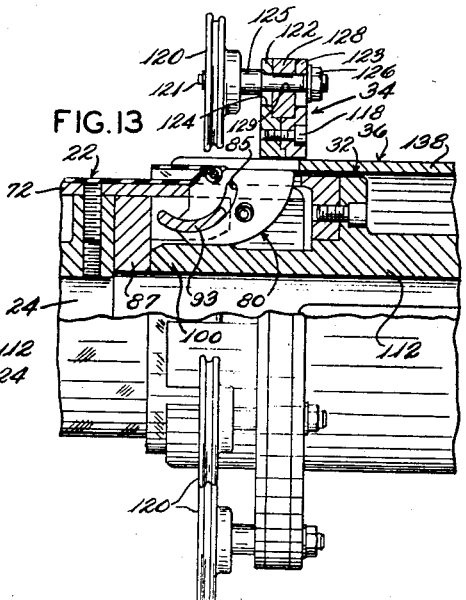

J. L. HOLLIS ET AL 2,971,561

BEAD SETTING MECHANISM IN AN APPARATUS
FOR MAKING AIR SPRINGS

Filed Jan. 31, 1957

INVENTORS
JACK L. HOLLIS
ARTHUR W. SEKUS
BY
W. A. Fraser

ATTY.

INVENTORS
JACK L. HOLLIS
ARTHUR W. SEKUS
BY
W. G. Fraser
ATTY.

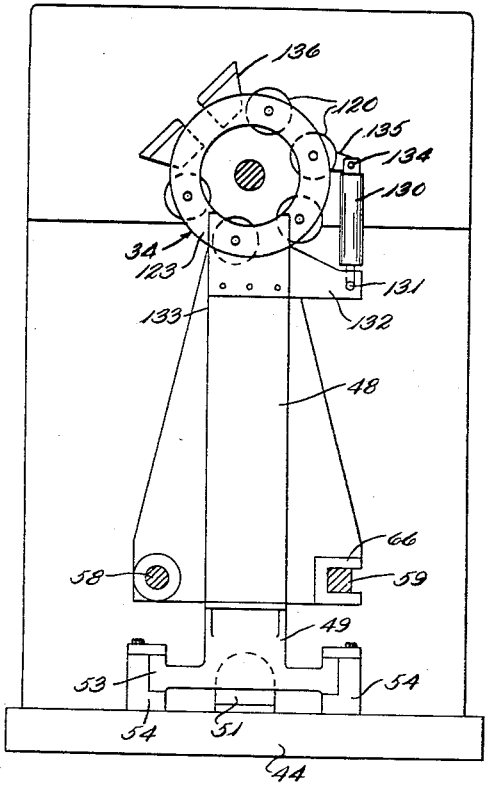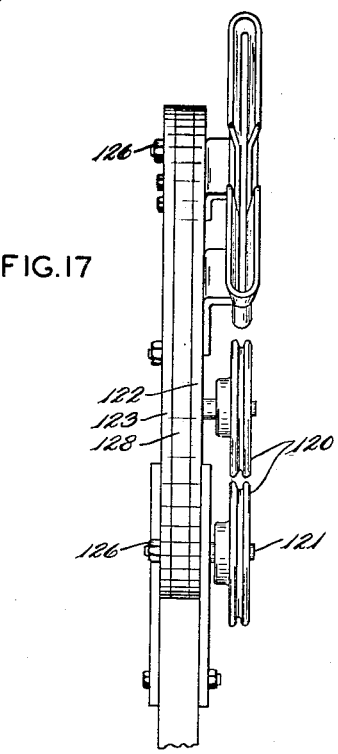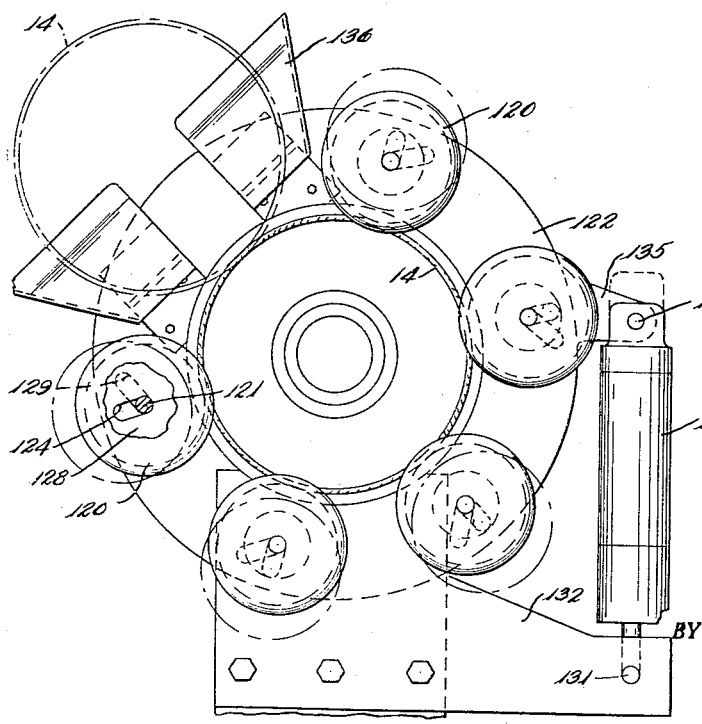

United States Patent Office 2,971,561
Patented Feb. 14, 1961

2,971,561

BEAD SETTING MECHANISM IN AN APPARATUS FOR MAKING AIR SPRINGS

Jack L. Hollis, Cuyahoga Falls, and Arthur W. Sekus, Akron, Ohio, assignors to The Firestone Tire & Rubber Company, Akron, Ohio, a corporation of Ohio Filed Jan. 31, 1957, Ser. No. 637,387

3 Claims. (Cl. 154—1)

This application relates to air springs and more particularly to improved methods and apparatus for manufacturing air springs.

An air spring which has had an outstanding commercial success in bus and truck wheel suspensions consists of a two convolution body of rubberized fabric plies, the ends of which are wrapped about and anchored to inextensible rings to form beads at the ends of the air springs. Such air springs are designed to operate under air pressures which are usually in the range of about 70–80 pounds per square inch, but under some service conditions the pressures may be as high as 100–150 pounds per square inch.

The air springs must have sufficient flexibility to undergo deflection for a great many cycles and must of course have sufficient mechanical strength to retain the high fluid pressures to which they are subjected. These two requirements of flexibility and of mechanical strength can be achieved to the fullest extent only by favorable methods of manufacture such as those embodying the present invention.

According to the present invention, an air spring having these properties is manufactured by assembling plies of essentially weftless, rubberized fabric in the form of a cylindrical body on a building drum. The plies at each end of the air spring are then expanded outwardly to larger diameters so that they can first engage and then be wrapped about and anchored to their respective bead rings. The expansion is performed by circumferentially spaced members in the building drum which force the plies radially outwardly into wedging engagement with the bead rings which are held in place for this purpose by chucking means which hold the bead rings externally during this operation. When the plies are expanded, the support of the bead rings is transferred from the chucking means to the expanded plies which support the rings at their inside surfaces and while the bead rings are so held, the end portions of the plies are turned about the rings to form the beads. The arrangement is advantageous from the standpoint of convenience and economy of manufacture and it enables an air spring of a uniformly high quality to be produced.

Accordingly, it is a general object of the invention to provide an improved apparatus and method for manufacturing air springs.

A more specific object is to provide a building drum construction enabling the fabric plies of an air spring to be expanded radially outwardly in a manner to engage and hold a bead ring against dislodgement when the plies are subsequently turned and stitched about the bead ring.

Another object is to provide apparatus for expanding the fabric plies of a cylindrical air spring body into outwardly flared form.

Yet another object is to provide a method of building an air spring which consists in first assembling the body plies in cylindrical form and then expanding the plies at opposite ends to form a body of flaring form terminating in beads of larger diameter than the cylindrical form.

Yet another object is to provide effective means to hold the beads of an air spring in place while the plies are expanded outwardly into contact with the rings.

Another object is to provide improved means for turning the fabric plies of an air spring about bead rings to form compact and strong bead structures.

Another object is to provide apparatus for building an air spring in which the building steps are performed virtually automatically and with a minimum of labor.

Another object is to provide a method of building an air spring which will be of uniformly high quality, which will be effective in operation and durable in service.

Further objects are to provide an apparatus for manufacturing air springs which is simple and effective in design, which is rugged in service and which requires a minimum of maintenance.

These and further objects and advantages will more fully appear from the following description of a preferred form of the invention, reference being had to the accompanying drawings in which:

Figure 1 is a side elevation of an air spring building drum and associated apparatus embodying the present invention;

Figure 2 is a somewhat diagrammatic view showing in side elevation the essential parts of the apparatus of Figure 1, the drum being shown just prior to the beginning of the building operations, with the bead holding chucks in their loading position;

Figure 3 is a view similar to Figure 2 showing the bead holding chucks retracted and the plies of the air spring body assembled on the building drum;

Figure 4 is a view similar to Figure 3 showing the bead holding chucks which at this time hold the bead rings, moved into position to position the beads for the ply expanding operation;

Figure 5 is a view similar to Figure 4 showing the next step in which the plies are expanded outwardly into contact with the bead rings;

Figure 6 is a fragmentary view similar to Figure 5, but on a larger scale, showing the next step in the operation, with the bead holding chuck withdrawn and indicating the manner in which the end portions of the expanded plies are turned axially around the bead rings;

Figure 7 is a view similar to Figure 6 showing the radial stitching of the inturned plies to complete the forming of the beads of the air spring;

Figure 12 is a fragmentary view partly in longitudinal section of the right-hand portion of the building drum of Figure 10 and on a slightly larger scale than Figure 10, showing the drum expanded and the plies forced against the bead ring which is held in position by the bead chuck;

Figure 13 is a fragmentary view similar to Figure 12 showing the plies turned axially around the bead rings, the plies being broken away to show the operation more clearly;

Figure 14 is a sectional view of the unexpanded building drum, the view being taken in the place indicated by the lines 14—14 in Figure 11;

Figure 15 is a sectional view similar to Figure 14 but showing the building drum in the expanded position with the plies in place on the expanded drum;

Figure 16 is a right-end elevation partially in section of the right-hand bead holding chuck showing the manner in which it is supported and moved;

Figure 17 is a side elevation of the bead holding chuck of Figure 16 on a larger scale than Figure 16;

Figure 18 is an end elevation of the bead holding chuck of Figure 17 showing the manner in which the bead holding chuck engages and holds a bead ring.

Figure 10:
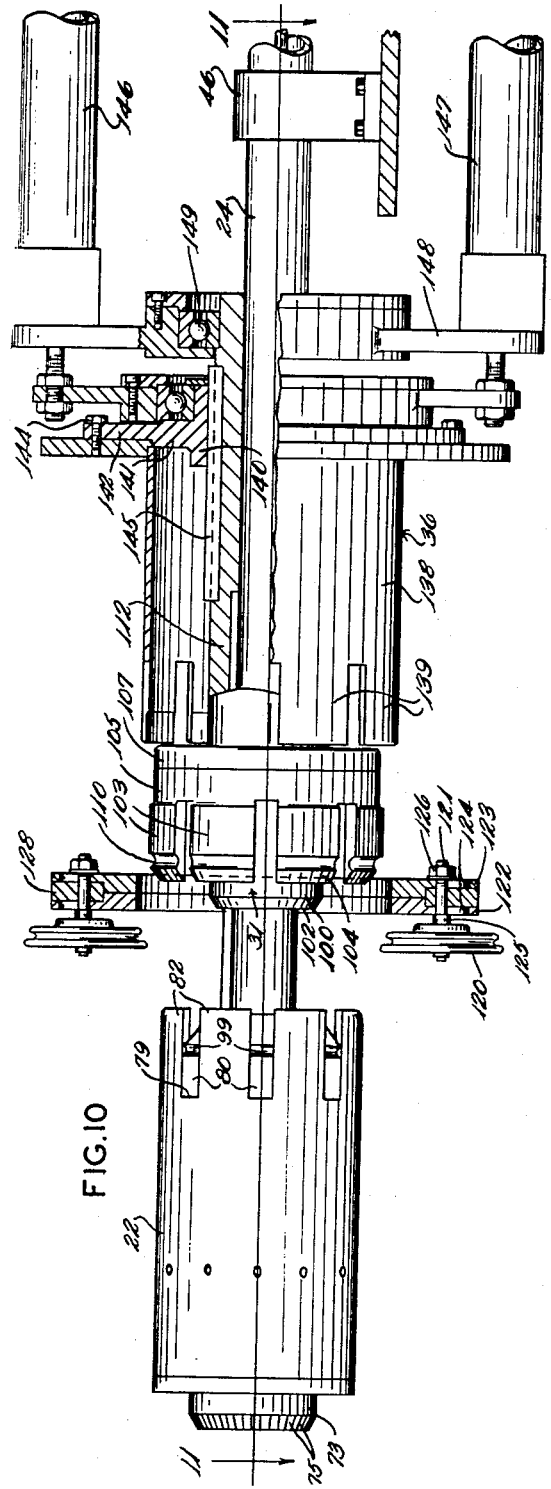
Figure 10 is a side view of the right-hand portions of the building drum of Figure 1, the view being on an enlarged scale and being partly in section to show more clearly the details of construction.

The apparatus and method of the present invention is illustrated and will be described with reference to the building of a more or less conventional two-convolution air spring, referred to generally at 10 in the drawings, and which is of the type shown and described in detail in U.S. Patent No. 2,713,498 to Roy W. Brown, issued July 19, 1955, see Figure 9.

Figure 8:
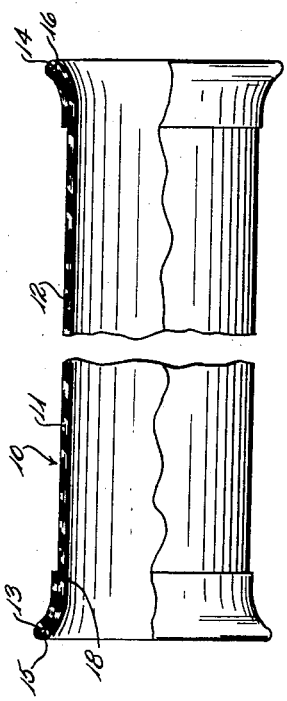
Figure 8 is a view, partly broken away, of an air spring body manufactured in accordance with the present invention, the air spring being shown just after it is removed from the building drum prior to the final shaping and vulcanizing operation.

Such an air spring is initially built upon a drum in the form of a substantially cylindrical body such as shown in Figure 8 and is later expanded and shaped by fluid pressure into a heated mold and vulcanized in its final shape.

Such an air spring 10 comprises a body of two plies 11 and 12 of rubberized fabric, preferably nylon, the plies being initially bias-cut so that the cords extend at an angle of about 15°–18° to the longitudinal axis of the air spring with the cords of one ply extending at an angle opposite to the cords of the other ply. The body plies are wrapped about and anchored to a pair of substantially circular bead rings 13 and 14 to form the beads 15 and 16 of the air spring. Usually the air spring has an impervious lining 18 of neoprene rubber to enable it to hold air under the required operating pressures.

Figure 9:
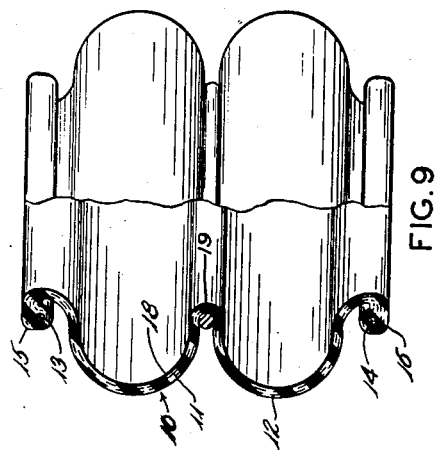
Figure 9 is a side elevation, partly in section, of a finished air spring molded from an air spring body such as that shown in Figure 8.

It will be noted, from Figure 9, that the central portion 19 connecting the convolutions of the air spring has a diameter smaller than the diameters of the beads 15 and 16. In the present example, it is the diameter of portion 19, which is the minimum diameter of the finished air spring, which determines the diameter of the building drum, for while it is possible to expand portions of an uncured air spring to larger diameters, it is not feasible to shrink a portion to a smaller diameter. Accordingly, the uncured air spring should have a body of generally cylindrical form and of a diameter equal to the smallest diameter of the finished air spring and hence in the present example the body plies must flare outwardly at the ends to accommodate the larger diameter beads.

Before describing in detail the construction of the apparatus which will produce such an air spring body, it is believed that a general outline of the operation and function of the apparatus will be helpful. Accordingly reference will be first made to Figure 1 and to the diagrammatic sketches of Figures 2 to 7, inclusive, in which only the major parts of the apparatus and the functional relation to each other are illustrated. In this initial discussion no effort will be made to describe the details of construction.

As shown in Figure 1 such apparatus comprises a building drum 20 which is separable at about its mid-point into a pair of drum sections 21 and 22; the left-hand drum section 21 being mounted on a driven cantilever shaft 23, and the right-hand drum section 22 being mounted for idling rotation on a shaft 24. The outer ends 25 and 26 of the drum are provided with recessed portions helping to form bead seats when the drum is expanded, the bead seats being adapted to receive and hold the bead rings 13 and 14 of the air spring during the latter phases of the building operation. The drum ends 25 and 26 are radially expandable by means of a pair of tapered expanding mandrels 31 and 32. Finally, a pair of bead ring chucks 33 and 34 are provided to hold the bead rings initially and to transfer them to the bead seats 27 and 28 in the building operation.

In the first building step, see Figure 2, the drum sections 21 and 22 are separated and the bead ring chucks 33 and 34 are positioned in the gap between the drum sections so that the bead rings can be loaded into the chucks. These bead ring chucks are open at one side so that the inextensible wire bead rings 13 and 14 can be readily inserted.

In the next step, see Figure 3, the drum sections are brought together, and the bead ring chucks 33 and 34, carrying the bead rings 13 and 14, are moved outwardly beyond the ends of the drum to give the operator free access to the drum. The rubber inner lining ply 18 is then applied to the drum with the ends of the liner just overlapping the bead seats 27 and 28. Then, the fabric plies 11 and 12 of bias-cut fabric, are applied over the inner liner and the plies are stitched together to form the body of the air spring. The fabric plies overlap the bead seats and the inner lining by about one inch on each end.

In the next step, see Figure 4, the bead ring chucks 33 and 34 are brought into position over the ends 25 and 26 of the drum so that the bead rings 13 and 14 are aligned with the bead seats 27 and 28, respectively. The expanding mandrels 31 and 32 are then brought inwardly into contact with the ends 25 and 26 of the drum thereby expanding the ends of the drum radially outwardly and causing the grooved portions which comprise the bead seats 27 and 28 to move outwardly to grip the bead rings 13 and 14, see Figure 5. As soon as the bead rings are fully seated in the bead seats, the bead setting chucks 33 and 34 are expanded to release their grip on the bead rings and the chucks are moved axially away from the working area of the drum.

In the next step, see Figure 6, a pair of ply-turning sleeves 35 and 36 are moved axially inwardly in a telescoping movement over the expanded ends of the drum to engage the ends of the plies 11 and 12 and turn them around the bead rings 13 and 14 and back onto the body of the air spring.

The inwardly turned ply ends are then stitched firmly about the beads by means of a hand stitcher (not shown), or if desirable, by a powered contour stitcher. Prior to this stitching operation the ply turn-up sleeves 35 and 36 are retracted so that they will not interfere with the stitching operation. Finally, an outer cover of gum rubber is applied to the body of the air spring with this last ply of rubber overlapping the inturned ply ends. During this last step the drum ends 25 and 26 remain expanded.

In order to remove the assembled air spring from the building drum, the drum ends are collapsed by retracting the expanding mandrels 31 and 32 and air under pressure is introduced between the drum section 21 and the body of the air spring as the drum sections are separated. The compressed air releases the frictional grip of the body upon the drum section 21 and as the sections move apart, the air spring is carried to the right by the drum section 22. Air is then introduced between the air spring and the drum section 22 and the air spring is manually removed from the drum. The gap between the drum sections when they are fully separated is such as to enable this stripping operation to be done conveniently.

With this general outline of the function and operation of the apparatus, the construction of the apparatus will now be described; first, in its general organization, and then in its details.

*Construction of the apparatus in general*

The manner in which the major elements of the apparatus are assembled into an integrated machine is best shown in Figure 1. The shaft 23, which carries drum section 21 is journalled in spaced bearings 41 and 42 and is driven by conventional means including the chain and sprocket arrangement 43, all of which is supported on a base 44 and enclosed by a housing 45. The shaft 24 which carries drum section 22 is journalled in suitable bearings 46, see Figures 1 and 10, which are supported by a column 48 mounted on a carriage 49. The carriage 49 is movable in the longitudinal direction to carry the drum section 22 bodily into and out of engagement with drum section 21, the carriage being driven by a long-stroke pneumatic cylinder 51 whose piston rod 52 is connected directly to the carriage. The carriage is guided in this movement by a pair of parallel base members 53 which slide along fixed ways 54 at the base 44 of the apparatus.

The bead ring chucks 33 and 34 are supported on carriages 56 and 57 which are likewise movable in a longitudinal direction so that they can be moved into and out of their operative positions. Each carriage is supported by and movable along a longitudinal extending threaded shaft 58 and along a rectangular bar 59 parallel to the shaft 55. Both the shaft and bar are supported at their ends by the upright members 60 and 61. The shaft 58 is provided with threaded portions 62 and 63 of right and left-hand threads, respectively, and the carriages have internally threaded sleeves 64 and 65 engaging the threaded portions 62 and 63 so that rotation of the shaft 58 in one direction will cause the carriages and bead ring chucks to move closer together while rotation in the opposite direction will cause bead ring chucks to move apart, as desired, in the building operation. The threaded shaft 58 may be rotated by any suitable means. The carriages 56 and 57 have channel members 66 forming part of their bases which engage and slide along the rectangular bar 59, see Figure 16.

*The drum sections and the ply-expanding mechanisms*

In most respects the drum sections 21 and 22 and the associated ply-expanding mechanisms are virtually identical and accordingly only the right-hand drum section will be described in detail. Where possible, the same reference numerals will be applied to corresponding parts of both drum sections with the parts of the left-hand section 21 and associated apparatus being identified by the suffix *a* appearing after such reference numeral.

Figure 11:
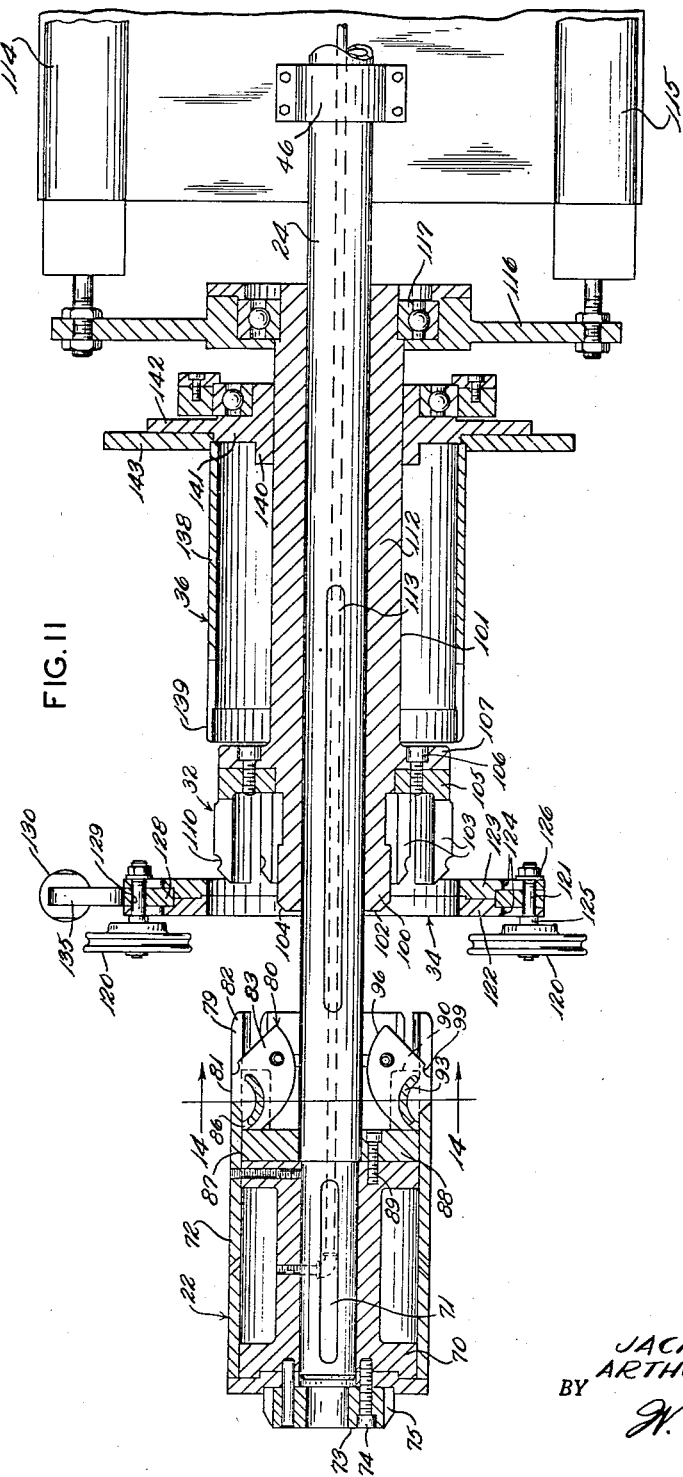
Figure 11 is a longitudinal sectional view of the apparatus of Figure 10, the view being taken in the plane indicated by the lines 11—11 of Figure 10.

The construction of the drum section 22 is shown in detail in Figure 11. Essentially, it comprises a hub member 70 which is keyed at 71 to the idling shaft 24. The hub supports the cylindrical shell 72 whose outer surface comprises the building surface of the drum. In order to lock the drum sections 21 and 22 together so that they will rotate as a unit, the drum section 22 is provided with a pilot portion 73 which is secured as by machine screws 74 to the hub 70 of the drum section. The pilot portion 73 is circular in section and has a plurality of splines 75 which are adapted to engage in a splined recess 77 of the drum section 21.

As mentioned above, the outer ends of the drum sections are expanded to force the plies outwardly and grip the beads of the air spring during the building operation. While a variety of constructions may be used, that illustrated in Figures 10 and 11 is preferred. Thus the drum section 22 is slotted about its periphery as indicated at 79 to receive a series of pivotal segments 80. Each of the segments 80 fits closely within its slot so that its outer surface 81 lies flush with the cylindrical surface of the drum, enabling the fabric plies to be laid easily upon the drum and to be stitched firmly together to form a cylindrical air spring body, as described above. It will be noted that the extreme outer portions 82 of the slots 79 are not filled by the segments but this is not objectionable, as this portion of the drum supports the ply portions which are to be turned about the bead ring and the stitching which is done on these portions after the ply-turning operation is sufficient to unite the plies.

The segments 80 are shown in Figure 10 in retracted position. The expanded position of the segments is shown in Figures 12 and 13. Each segment 80 comprises a block of metal about one-half inch thick and having a shape best shown in Figures 12 and 14. Each flat side 83 of the segment has an arcuate slot 85 milled into it to a depth of ⅛ inch and opening as indicated at 86 to the inner end of the segment as shown.

The segments, preferably 8 in number, are assembled with a spider-like member, indicated generally at 87, comprising an annular ring 88 which is secured to the hub 70 of the drum section 22 as by machine screws 89. A plurality of bracket members 90 which are circumferentially spaced about and secured to the outside surface of the ring, are adapted to receive and hold the segments for their pivoting movement. Each bracket member 90 is U-shaped with parallel arms 91 extending outwardly from the base of the bracket to define a notch 92 and each arm has an arcuate rib 93 integral therewith extending out into the notch 92 about ⅛ inch. The segments 80 are assembled with the brackets 90 by fitting the inner ends of the segments between the arms 91 of the brackets with the ends of the ribs 93 entering the open ends 86 of the arcuate slots 85 in the segments. The segments are then moved fully into the brackets by giving a slight clockwise rotary motion to the parts as they are forced together. The brackets are of course positioned within the drum section 22 so that the notches 92 are radially aligned with the slots 79.

The segments are expanded radially outwardly as previously described with reference to Figure 11 and as shown more clearly in Figures 12 and 13, by the conical nose 100 of the expanding mandrel 31 which is moved axially inwardly into contact with the cam surfaces 96 of the segments. As the nose moves in under the segments, the segments are caused to rotate upon the arcuate ribs 93 until they take the position shown in Figures 12 and 15. At the end of the forward movement of the mandrel 31, the end face 102 of the nose of the mandrel will abut the ring member 87 and the nose of the mandrel will lie within and will support the segments in their expanded position. The rotation of the segments takes place about the centers of curvature of the arcuate ribs 93 of the slots 85 which are designed so that the centers of curvature fall at the surface of the drum. This feature enables the fabric plies to be expanded without imposing any longitudinal stress upon the plies and minimizes the wrinkling which would otherwise take place.

The expanding mandrel 31 is designed so that it not only rotates the segments outwardly but also intermeshes with the expanded segments so that the mandrel and segments as assembled together present a virtually unbroken surface to facilitate the stitching of the plies about the bead ring. This is accomplished by a plurality of fingers 103 which are secured to the body of the mandrel by radial flanges 105 which are fastened by machine screws 106 to the radial flange 107 of the mandrel. The fingers 103 have tapered end surfaces 104 which are aligned with the surfaces 81 of the expanded segments to form a continuous support surface for the plies. The fingers also have circumferential grooves 110 which are aligned with the grooves 99 of the segments to form the continuous unbroken bead seat 28. See particularly Figures 10 and 11.

The body of the expanding mandrel 31 comprises a long sleeve 112 which has a close sliding fit upon the shaft 24, and the sleeve is keyed to the shaft by means of a key (not shown) and a longitudinally extended keyway 113 in shaft 24, see Figure 11. This arrangement permits the mandrel to rotate with the shaft 24 and drum section 22 and yet have the required longitudinal movement along the shaft with respect to the drum section 22 when it is necessary to expand the segments. The mandrel is moved along the shaft 24 by a pair of air cylinders 114 and 115 acting upon a yoke 116 which is connected by a bearing 117 to the outward end of the mandrel. The bearing 117 permits rotation of the mandrel without imparting torque to the air cylinders. The cylinders are mounted on the carriage 49 so that the drum section 22 and mandrel will move bodily together when the drum sections are parted at the end of the building operation and also when the drum sections are brought together at the beginning of the building operation.

*The bead-setting mechanism*

As mentioned above, the bead ring 14 is held in a bead ring chuck 34 in such a relation to the expanding drum segments that the bead ring 14 will seat and be held within the bead seat 28 when the segments are fully expanded. Since the bead ring chucks 33 and 34 are identical in construction and operation, only the chuck 34 will be described.

Essentially the chuck 34 comprises a plurality of radially movable jaws which take the form of grooved rollers 120 arranged in the form of a circle as shown in Figures 16 and 18. The rollers are journalled on axially extending pins 121 which are supported by a pair of fixed annular members 122 and 123 held together by machine screws 118 to form the body of the chuck and mounted in fixed position to the carriage 57. Each pin 121 extends through aligned radial slots 124 in the members and are held to the members by the abutment of a radial flange 125 with member 122 and by the abutment of a nut 126 at the end of the pin with member 123. See Figure 12.

The grooved rollers 120 are moved from a circular position of small diameter (their closed position) in which they grip and hold the bead ring 14 to a position of larger diameter (their open position) to release the bead ring 14 by the arrangement best shown in Figures 12 and 18. As shown in Figure 12, the annular members 122 and 123 are axially spaced to form a circumferential groove 127 in which a rotatable ring member 128 is journalled. This ring member 128 has a plurality of diagonally extending slots or cam surfaces 129 through which the pins 121 also extend. When the central ring member 128 is rotated with respect to the fixed members 122 and 123, the sides of the diagonal slots 129 act as cams to force the pins radially back and forth in the radially extending slots or tracks 124 of the fixed members.

The relative rotation of the central ring 128 is produced by a pneumatic cylinder 130 which is pivotally mounted as indicated at 131 at its lower end to a bracket 132 projecting radially from the upright column 133 of the chuck carriage 57 and is pivotally connected at 134 at its upper end to a boss 135 projecting radially from the central ring member 128, see Figure 16. The pivotal connections 131 and 134 at each end of the cylinder enable the motion of the cylinder to be translated into rotational movement of the ring member 128.

At the beginning of the building operation the bead chuck 34 (and chuck 33 as well) is positioned between the spaced drum sections, see Figure 2, and the rollers 120 are in their open position so that the bead ring 14 can be introduced into the chuck through a radially open chute 136 with the bead ring coming to rest within the grooved edges of the lowermost rollers. The chuck is then closed (by rotation of the ring member 128) so that the bead ring 14 is gripped at its external surfaces and centered by the engagement of all of the rollers 120. The bead ring 14 is thus held securely against displacement until it is subsequently transferred to the expanded drum section 22. As soon as the bead rings are loaded in the chucks, the chucks are moved apart to the position of Figure 3 to clear the drum for the building operation. After the plies have been assembled on the drum the chucks are moved into position, see Figures 4 and 5, where the bead rings are properly aligned with respect to the segments 80 so that when the segments are expanded the bead rings will be seated within the bead seats 27 and 28, forcing the plies into the seats under them and becoming partially embedded in the plies and sufficiently supported by the bead seats so as to be secure against displacement when the plies are later turned and stitched around the beads. The positioning of the chucks is determined by stop members or any other suitable means for controlling the movement of the chuck carriages 56 and 57.

*The ply-turning mechanisms*

After the ends of the fabric plies are expanded into conical shape by the expansion of the segments, the portions of the plies projecting axially beyond the bead ring 14, see Figure 12, are turned axially back and around the bead ring 14 while it remains seated within the bead seat 28 by a ply-turning sleeve 138 having a plurality of axial projections 139 or fingers corresponding in number and in size to the mandrel fingers 103 which intermesh with the expanding segments 80. The inner surfaces of the sleeve projections 139 lie in a circle which is slightly greater in diameter than the bead ring 14. When the sleeve 138 is moved inwardly towards the drum section 22, the projections 139 move between the outer ends of the segments and engage the fabric plies between the segments forcing the plies inwardly and about the bead ring in the manner shown in Figure 13.

As shown in Figure 10, the ply-turning sleeve 138 is mounted on a suitable hub member 140 by means of the radial flanges 141 and 142 and the screws 144 and the hub member 140 is keyed as indicated at 145 to the body 112 of the expanding mandrel 31 so that the ply-turning sleeve will rotate with the mandrel and with the drum section 22 . By this construction, it is ensured that the projections 139 will always mesh with the segments. The manner in which the ply-turning sleeve 138 is keyed to the mandrel also permits the required longitudinal movement of the sleeve upon the mandrel during the ply-turning operation, this longitudinal movement being produced by a pair of pneumatic cylinders 146 and 147 which act upon the ply-turning sleeve through a yoke 148 and a bearing 149 similar to the bearing 117 of the expanding mandrel. The arrangement thus permits the ply-turning sleeve to turn with the shaft 24 and at the same time enables longitudinal movement of the ply-turning sleeve on the mandrel.

After the plies have been turned axially around the bead ring, the ply-turning sleeve 138 is withdrawn and the plies are stitched tightly around the bead ring by a stitcher 150, which exerts radial stitching pressure on the plies, see Figure 7, to compact the bead. Then the air spring body is finished and stripped from the building drum as described above.

While the invention has been described in connection with the two-convolution bellows, shown and described in Figure 9, it can be used to advantage in the manufacture of two-convolution bellows having a central portion of greater diameter than that of the beads such as the air spring shown and described in the co-pending U.S. patent application of Roy W. Brown, Serial No. 549,437, filed November 28, 1955, and also in the production of a single-convolution bellows such as that shown and described in the co-pending U.S. patent application of Roy W. Brown and Jack L. Hollis, Serial No. 521,031, filed July 11, 1955, which is a single-convolution air spring terminating in beads of appreciably different diameter.

Various modifications and changes in the apparatus and method embodying the invention herein will no doubt occur to those skilled in the art without departing from the scope of invention the essential features of which are summarized in the appended claims:

We claim:

1. Apparatus for manufacturing an air spring which comprises a body terminating in an edge reinforced and strengthened by a substantially inextensible bead ring, said apparatus comprising, in combination, a plurality of jaws arranged in a substantially circular pattern and contractible radially to exert clamping pressure upon the external surfaces of the outside diameter of said bead ring to hold said bead ring concentric with and adjacent one edge of said air spring body and means to expand said air spring body outwardly into wedging engagement with the inside diameter of said bead ring while said ring is held by said jaws, said jaws comprising grooved rolls, the grooved portions of which engage only the outer surfaces of said bead rings when said jaws are in contracted position.

2. Apparatus for manufacturing an air spring which comprises a body terminating in an edge reinforced and strengthened by a substantially inextensible bead ring, said apparatus comprising, in combination, a plurality of circumferentially arranged, radially actuated jaws, said jaws having radial inner ends adapted to engage and clamp the radially outer surface of said ring, means to move said jaws radially, whereby to hold said bead ring concentric with and adjacent one end of said airspring, and means to expand said airspring body outwardly into wedging engagement with the inside diameter of said bead ring while said ring is held by said jaws.

3. Apparatus according to claim 2, in which said first means comprises radially extending tracks guiding said jaws and diagonally extending cam surfaces actuating said jaws, and means to move said cam surfaces circumferentially relative said tracks, to give said jaws radial movement within said tracks.

References Cited in the file of this patent

UNITED STATES PATENTS

| | | |
|---|---|---|
| 1,952,905 | Bostwick | Mar. 27, 1934 |
| 2,034,642 | Stevens | Mar. 17, 1936 |
| 2,385,055 | Breslove | Sept. 18, 1945 |
| 2,614,952 | Kraft | Oct. 21, 1952 |

FOREIGN PATENTS

| | | |
|---|---|---|
| 432,601 | Great Britain | July 30, 1935 |